UNITED STATES PATENT OFFICE.

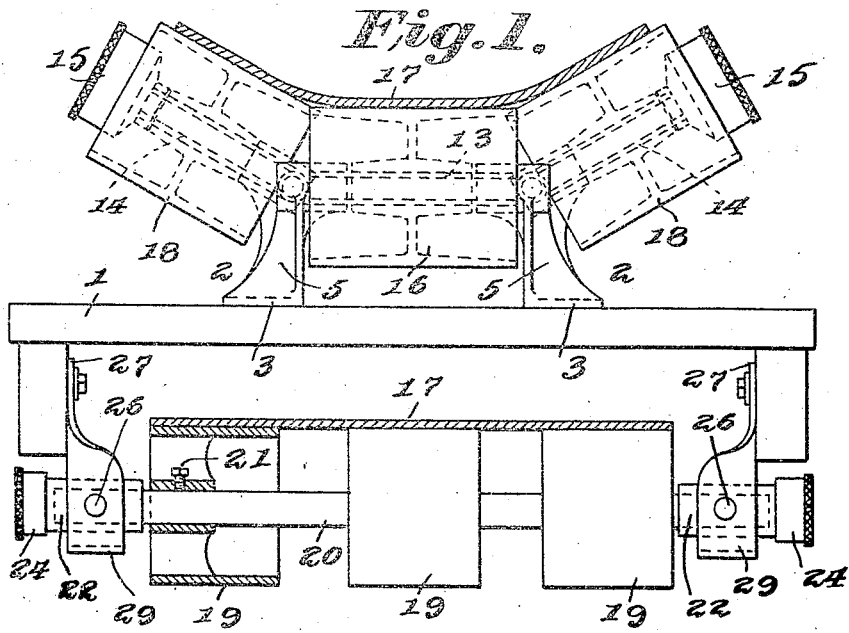
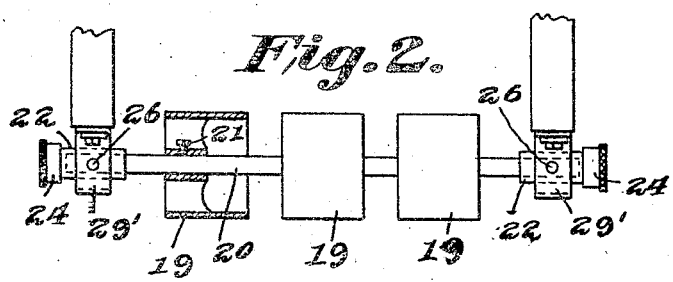
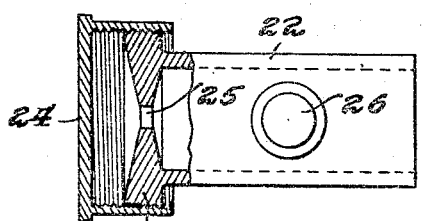
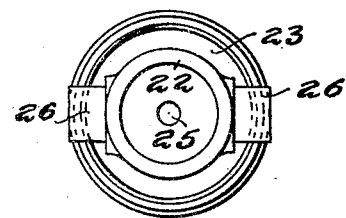
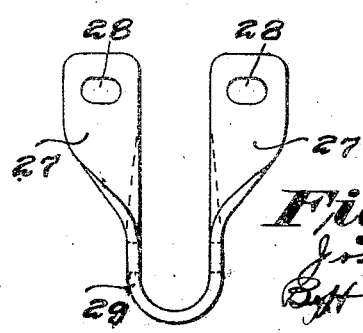

JOSEPH DIERDORFF, OF COLUMBUS, OHIO, ASSIGNOR TO THE JEFFREY MANUFACTURING COMPANY, A CORPORATION OF OHIO.

SHAFT-HANGER.

1,205,601.        Specification of Letters Patent.     Patented Nov. 21, 1916.

Application filed April 27, 1911. Serial No. 623,640.

*To all whom it may concern:*

Be it known that I, JOSEPH DIERDORFF, a citizen of the United States, residing at Columbus, in the county of Franklin and State of Ohio, have invented certain new and useful Improvements in Shaft-Hangers, of which the following is a specification, reference being had therein to the accompanying drawing.

This invention relates to improvements in shaft hangers and particularly to the type of hangers adapted for use in connection with conveyer belt supports.

In the drawings: Fig. 1 is a side elevation of the troughing pulleys and return belt idlers, one of the return belt idlers being shown in section. Fig. 2 is a side elevation of the return belt idlers showing a modification of the bearing hangers. Fig. 3 is a side elevation of a return belt idler shaft bearing with parts broken away. Fig. 4 is an end elevation of the same. Fig. 5 is an end elevation of a bearing hanger.

Referring to the drawings, the numeral 1 represents a transverse member on which two upright troughing pulley supports, designated in general by the numeral 2, are mounted. These supports comprise base portions 3 upon which an upright web 5 is formed, the upper end of the web carrying suitable brackets in which are mounted hollow shafts 13 and 14 on which the pulleys 16 and 18 rotate. A continuous passage is provided through the upper ends of the webs 5 so that the grease may be forced from the cups 15 through the entire line of shafting and thereby lubricate the pulley bearings. The troughing pulleys 16 and 18 serve to carry the conveyer belt 17 when it is loaded with material and turn the edges up at a suitable angle to prevent the material from over-running the sides.

The return belt idlers 19 are secured upon a solid shaft 20 by some suitable means, as the set screws 21, the ends of the shaft being journaled in tubular bearing boxes 22. At the outer end of each bearing 22 there is provided an outward extending flange 23 which is externally threaded and an inward extending flange which is provided at 25 with a restricted opening. These flanges adapt the outer end of the bearing to serve as the base portion of a grease container. The main body portion of the grease container consists of a grease cup 24 which is internally threaded to engage the threaded flange 23. Two horizontal radially extending lugs 26 are formed on the tubular portion and act as supporting pivots for the bearing box.

The shafts used in constructions of this sort, such as the shaft 20, are, for economy in metal, made as light as possible, in ordinary belt conveyers being less than one inch in diameter. They are liable, because of variations in the tension exerted on the belt, to be thrown somewhat out of line, and even to spring to and from their axial position. To compensate for this, I have mounted the bearings at the ends of the shaft in such a way that they can swing on the horizontal axes of the trunnion projections 26, as required. This prevents cramping or binding and insures practically free rotation of the shaft at all times.

Figs. 1 and 5 illustrate one type of bearing hanger adapted to receive the horizontal extending lugs 26 of the bearing box. The hangers are formed of strip metal bent in substantially U-shaped form, the upper portions or legs of the U being flanged outward as at 27 to form ears in which the supporting bolt holes 28 are formed. The lower or bottom portion 29 of the hanger has two oppositely-disposed holes formed therein to receive the lugs 26 which extend from the bearing. The hangers have sufficient flexibility to be sprung open thereby allowing the lugs on the bearing box to be placed in the holes provided in the lower part of the hangers for that purpose. The bolt holes 28 are elongated so that by loosening the bolts, the upper ends of the hanger may be spread apart thereby allowing the removal of the bearing if necessary. By this construction the bearing boxes are pivotally mounted in such a way as to be vibratable vertically, which permits them to move in accordance with the movements of the journal portions of the shaft when it is flexed or bent, thus avoiding any binding or cramping between the shaft and the bearing boxes.

The procedure in mounting or removing a shaft or one of the bearings will be readily understood. It is not necessary to remove from position any of the bolts, or other parts. To take out a bearing all that is required is to loosen one or both of the bolts in the slots 28. The two legs of the integral U-shaped hanger can then be spread apart sufficiently to have one or both of the pivot lugs 26 released from the apertures near the bottom loop part. And when the parts are to be re-assembled, the box is placed between the two legs of the hanger and moved down until, first, one, and then the other, of the pivot trunnions enters its supporting aperture; after which the upper ends of the bracket legs are brought to their innermost positions and the bolts in the slots are set tightly. The trunnion pivots 26 not only serve to permit the bearing box to adapt itself to the position of the shaft, but also prevent the box from rotating when the shaft is turning.

I am aware of the fact that the rotary hubs of vehicle wheels have been provided with axially arranged adjustable lubricator cups; but I believe myself to be the first to have provided the article herein described for supporting and lubricating the end of a shaft, it comprising a bearing box, such as that at 22, with supporting projections 26 for detachably holding the box in position, and having an integral closing end wall, as at 23, the latter being extended radially outward beyond the wall of the box so as to be adapted to sustain a threaded axially adjustable lubricator cup like that at 24. This article, to wit, the bearing box 22 and the cup, are manufactured and retained in stock, and they are supplied as standard articles for conveyer outfits.

A modification of the hanger above described is shown in Fig. 2. In this case the upper portions of the U-shaped strip are bent outward in a plane perpendicular to the U and are adapted to be fastened to the lower portion of the support.

What I claim is:

1. In an apparatus for supporting a conveyer belt, the combination of a shaft, bearing boxes at the ends of the shaft each provided with pivot trunnions, suspending U-shaped hangers for said boxes, each having two integral arms provided with apertures for detachably receiving said trunnions and adapted to have their upper ends move toward and from each other to release the pivoted box, and means for securing said arms of each hanger rigidly in operative position to hold the box as set forth.

2. In an apparatus for supporting a conveyer belt, the combination of a shaft, bearing boxes at the ends of the shaft, suspending brackets, and fastening devices for the upper ends of said brackets, each of said brackets having two integral legs with their upper ends adapted to be moved from and toward each other while engaging with the fastening devices, each box being hinged on a horizontal axis to one of said brackets and adapted to be released from the bracket when its legs are separated as described.

3. In an apparatus for supporting and lubricating a belt supporting shaft, the herein described bearing box having a non-rotary part which is adapted to receive the end of a rotating shaft, pivot projections adapted to suspend the box and hold it against rotation, an end wall 23 integral with the box part and provided with a lubricant inlet, and a detachable and axially adjustable cup adapted to form, together with said end wall, a lubricant chamber.

4. The combination with a shaft, of a bearing box for an end of the shaft, the said bearing box having at its outer end an integrally formed externally threaded flange adapted to form the base portion of a grease container, a grease cup internally threaded to engage the said threaded flange of the bearing, a U-shaped bracket formed from a resilient strip of metal and provided with opposite circular holes in its lower portion, and opposite pivot lugs on the bearing extending into the holes in the bracket, the sides of the said bracket being normally spaced apart a distance approximately equal to the width of the said bearing at the bases of the lugs.

In testimony whereof I affix my signature, in presence of two witnesses.

JOSEPH DIERDORFF.

Witnesses:
Wm. M. Dierdorff,
Dudley T. Fisher.